(12) United States Patent
Le Quere

(10) Patent No.: US 8,678,444 B2
(45) Date of Patent: Mar. 25, 2014

(54) FLUID COUPLING HAVING A MOVING SEAL

(75) Inventor: Philippe Le Quere, Belton (FR)

(73) Assignee: Parker Hannifin France SAS, Rennes (FR)

( * ) Notice: Subject to any disclaimer, the term of this patent is extended or adjusted under 35 U.S.C. 154(b) by 76 days.

(21) Appl. No.: 13/174,102

(22) Filed: Jun. 30, 2011

(65) Prior Publication Data

US 2011/0309609 A1 Dec. 22, 2011

Related U.S. Application Data

(63) Continuation of application No. PCT/FR2010/000005, filed on Jan. 7, 2010.

(51) Int. Cl.
*F16L 17/00* (2006.01)
(52) U.S. Cl.
USPC .......................................... 285/106; 285/108
(58) Field of Classification Search
USPC .................. 285/106, 95, 104, 108, 345, 353
See application file for complete search history.

(56) References Cited

U.S. PATENT DOCUMENTS

| | | | | | |
|---|---|---|---|---|---|
| 486,383 | A | * | 11/1892 | Mercader | 285/106 |
| 1,896,062 | A | * | 2/1933 | Berry | 285/106 |
| 1,904,250 | A | * | 4/1933 | Purvis | 285/106 |
| 1,912,494 | A | * | 6/1933 | Patterson | 285/106 |
| 2,646,998 | A | * | 7/1953 | Scheiwer | 285/106 |
| 2,810,592 | A | * | 10/1957 | Williams | 285/106 |
| 3,046,026 | A | * | 7/1962 | Burrows | 285/106 |
| 3,695,642 | A | * | 10/1972 | DeWoody | 285/353 |
| 3,712,645 | A | * | 1/1973 | Herter | 285/351 |
| 4,688,830 | A | * | 8/1987 | Meisinger et al. | 285/106 |
| 4,819,966 | A | * | 4/1989 | Gibb | 285/106 |
| 4,886,303 | A | | 12/1989 | Carson et al. | |
| 5,673,945 | A | * | 10/1997 | Olson | 285/353 |
| 6,481,762 | B1 | | 11/2002 | Rex et al. | |
| 7,267,374 | B2 | * | 9/2007 | Nielson | 285/353 |
| 7,354,075 | B2 | * | 4/2008 | Hagen | 285/108 |
| 7,878,554 | B2 | * | 2/2011 | Le Bars | 285/345 |
| 8,287,006 | B2 | * | 10/2012 | Pedersen | 285/104 |
| 2006/0170212 | A1 | * | 8/2006 | Le Bars | 285/308 |

FOREIGN PATENT DOCUMENTS

| | | |
|---|---|---|
| FR | 1 086 073 A | 2/1955 |
| GB | 1 211 238 A | 11/1970 |
| WO | 98/19094 A | 5/1998 |

OTHER PUBLICATIONS

Written Opinion in corresponding International Application No. PCT/FR2010/000005, Feb. 13, 1998.

* cited by examiner

*Primary Examiner* — David E Bochna
(74) *Attorney, Agent, or Firm* — John A. Molnar

(57) ABSTRACT

A coupling element of a fluid circuit. The coupling element includes a tubular body externally provided with an annular shoulder in which a groove is provided having an end wall flanked by an outer side and by an inner side so as to receive an annular seal designed to bear against a surface surrounding an inlet orifice of a channel of a member to which the element is designed to be coupled. The body defines at least one passage for bringing the fluid into the groove so as to push the seal back against the outer surface of the groove, and against the surface surrounding the inlet orifice of the channel.

17 Claims, 2 Drawing Sheets

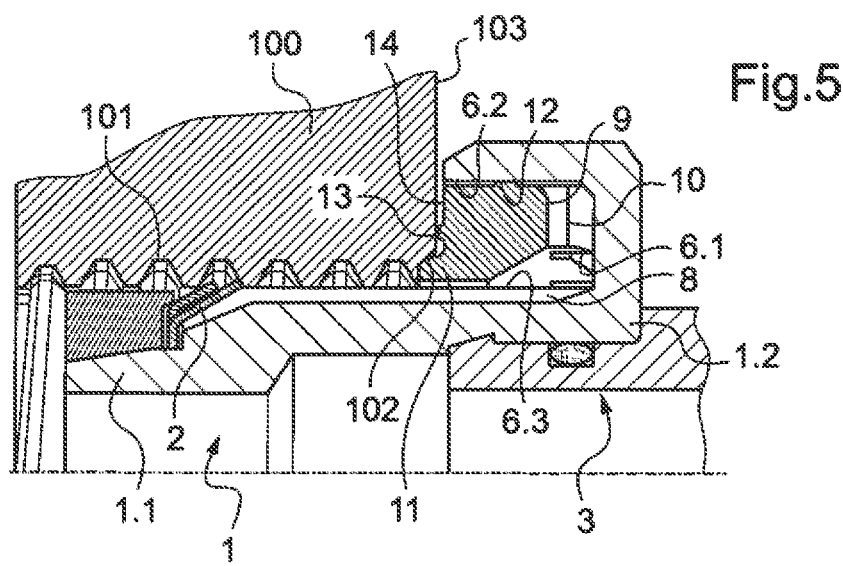
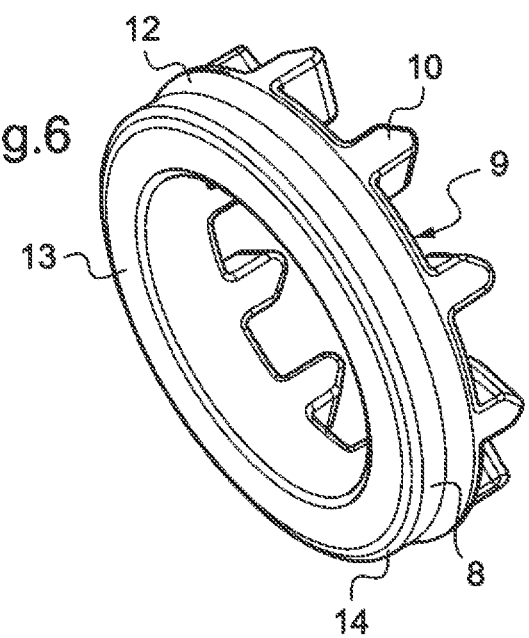
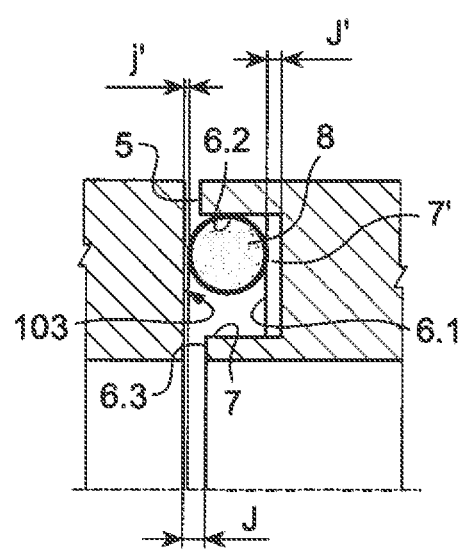

FLUID COUPLING HAVING A MOVING SEAL

CROSS-REFERENCE TO RELATED APPLICATIONS

This application is a continuation of co-pending International Application No. PCT/FR2010/000005, filed Jan. 7, 2010, which designated the United States, and which claims priority to French Application No. 08 00123, filed Jan. 13, 2009, the disclosure of each of which is expressly incorporated herein by reference.

BACKGROUND OF THE INVENTION

The present invention relates to an element of a fluid circuit. For example, the element may be a union making it possible to couple two pipes together, an end-piece or a coupling making it possible to connect a pipe to a member for delivering or for receiving fluid that is installed in the fluid circuit. For example, the member may be a manifold, an actuator, a flow-rate regulator or a pressure regulator, etc.

Fluid circuit elements such as couplings are known that each have a body provided externally with an annular shoulder from which a portion projects that is insertable into a channel in a member to which the element is to be coupled. A groove having an end wall flanked by an outer side and by an inner side is provided in the shoulder for the purpose of receiving an annular seal designed to be applied against a surface surrounding an inlet orifice of the channel in the member. At its end opposite from the insertable portion, the body has a portion designed to project to the outside of the member and provided with means for receiving and for securing in leaktight manner an end portion of a pipe.

When the element is mounted correctly on the member, the, seal is compressed between the surface surrounding the inlet orifice of the channel and the end wall of the groove so that the seal is in contact with the surface and with the end wall of the groove, thereby preventing any leakage of the fluid. Unfortunately, when the element is mounted incorrectly on the member or when it has come away due to the circuit in which it is installed being put under pressure, the seal is no longer sufficiently compressed between the surface surrounding the inlet orifice of the channel and the end wall of the groove, thereby allowing fluid to leak.

SUMMARY OF THE INVENTION

It therefore is desired to provide a way of making it possible to procure improved tolerance to variations in the axial positioning of such an element relative to the member on which it is installed.

The invention is directed to an element of a fluid circuit, which element includes a tubular body externally provided with an annular shoulder in which a groove is provided that has an end wall flanked by an outer side and by an inner side so as to receive an annular seal designed to bear against a surface surrounding an inlet orifice of a channel of a member to which the element is designed to be coupled. The body defines at least one passage for bringing the fluid into the groove in such a manner as to push the seal back against the outer surface of the groove, and against the surface surrounding the inlet orifice of the channel.

Thus, the pressure of the fluid presses the seal against the outer side of the groove and against the surface surrounding the orifice of the channel so as to seal the coupling in leaktight manner. In this way, leaktight sealing can be ensured while accommodating variation in the distance between the surface surrounding the inlet orifice of the channel and the end wall of the groove.

The passage may include a duct that opens out onto the inner side of the groove, and, advantageously, the duct also opens out onto the end wall of the groove.

The pressurized fluid can then easily reach most of the surface of the seal facing towards the end wall and the inner side of the groove so as to press the seal against the outer side and against the surface surrounding the orifice of the channel.

Projecting relative to the shoulder, the element may have an insertable portion that is insertable into the channel, the passage including at least one furrow extending axially over at least a fraction of the insertable portion, over at least a fraction of the inner side of the groove, and over at least a fraction of the end wall of the groove.

The passage can then be formed simply, in particular by milling or by being obtained directly by molding.

In a particular embodiment, facing the end wall of the groove, the seal has a surface provided with at least two projections keeping the surface spaced apart from the end wall of the groove, and the seal preferably has more than two projections distributed symmetrically.

The projections enable the fluid to exert pressure on the surface of the seal so as to apply the seal against the surface surrounding the orifice of the channel of the member more particularly when the end wall of the groove is plane.

According to a particular characteristic, the seal has an annular lip extending opposite from the end wall of the groove and in the vicinity of the inner side of the groove.

The lip makes it possible to limit the passage of fluid between the seal and the surface of the member surrounding the orifice of the channel in a manner such as to increase the difference in pressure between the surface of the seal facing the surface surrounding the orifice of the channel and the surface of the seal facing the end wall of the groove so as to facilitate application of the seal against the surface surrounding the orifice of the channel.

Other characteristics and advantages of the invention appear on reading the following description of particular non-limiting embodiments of the invention.

The present invention, accordingly, comprises the construction, combination of elements, and/or arrangement of parts and steps which are exemplified in the detailed disclosure to follow.

BRIEF DESCRIPTION OF THE DRAWINGS

Reference is made to the accompanying drawings, in which:

FIG. 5 is a view analogous to FIG. 2, showing a second embodiment of an element of the invention;

FIG. 6 is a perspective view of the seal in a variant of the second embodiment; and FIG. 7 is a view analogous to FIG. 1, showing a variant embodiment of an element.

Figure 1:
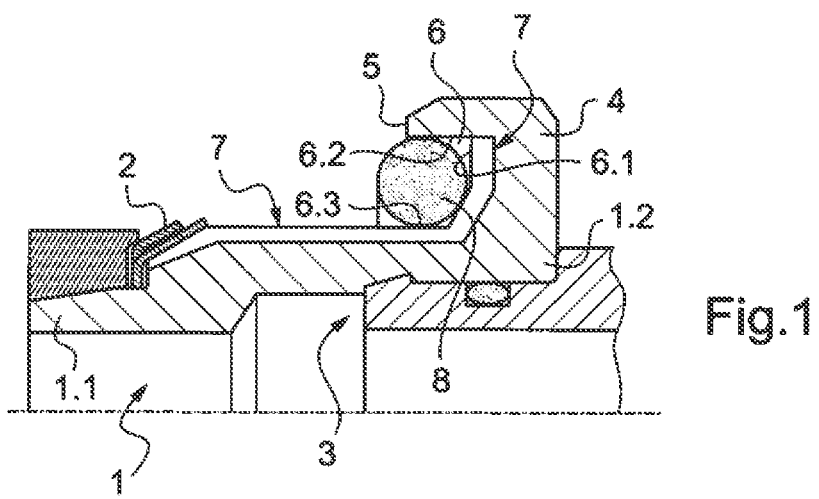
FIG. 1 is a half-view in longitudinal section of a first embodiment of an element of the invention.
Figure 2:
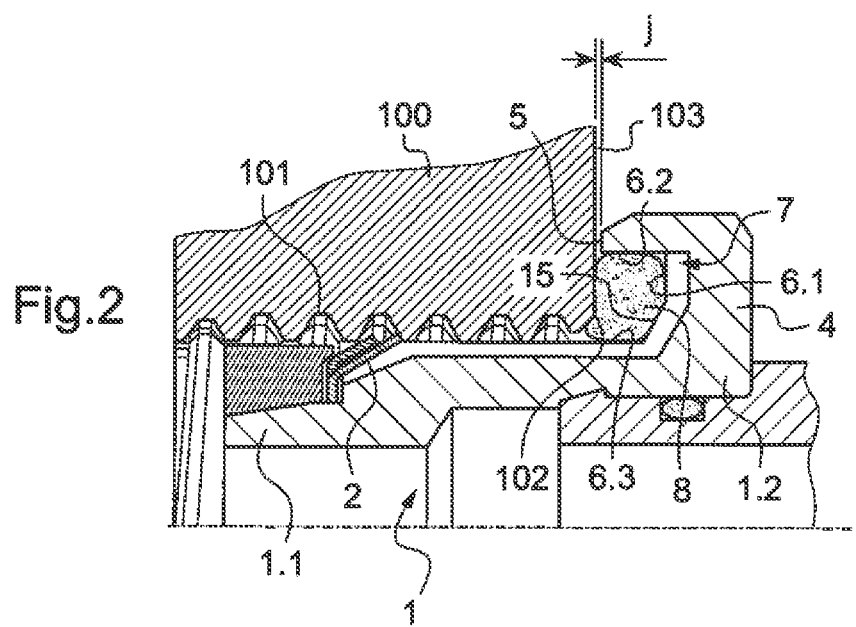
FIG. 2 is a view analogous to FIG. 1, showing the element engaged in a channel of a member to which it is coupled.

The drawings will be described further in connection with the following Detailed Description of the Invention.

DETAILED DESCRIPTION OF THE INVENTION

The element of the invention is a coupling designed to make it possible to connect a pipe end to a member 100 (FIG. 5) of a fluid circuit. Such member may be a member for delivering or for receiving fluid, and, for example, a manifold, an actuator, a tank, a pressure regulator or a flow-rate regulator, etc.

As shown in FIG. 5, the member 100 is provided with a channel 101 having an inlet orifice 102 opening out onto an outside surface 103 of the member 100. The portion of the channel 101 that extends in the vicinity of the inlet orifice 102 is tapped in this example.

The coupling includes a tubular body 1 having an end portion 1.1 provided with a toothed washer 2, making it possible to anchor the body 1 in the portion of the channel 101 that is adjacent to the inlet orifice 102. The teeth of the toothed washer 2 are arranged to bear against the thread of the tapped portion of the channel 101. At its end opposite from the end portion 1.1, the body 1 has an end portion 1.2 internally provided with a mechanism, designated by overall reference 3, for securing to the pipe end in leaktight manner. The leaktight securing means 3 are known and are not therefore described herein. These means may make it possible to fasten the pipe end to the coupling in permanent manner or, on the contrary, in releasable manner.

The end portion 1.2 is provided with an outer collar 4 having a face forming a shoulder 5 that faces towards the end portion 1.1. A plane and annular groove 6 is provided coaxially with the body 1 in the shoulder 5 and it has an end wall 6.1 flanked by an outer side 6.2 and by an inner side 6.3 extending in alignment with the outside surface of the body 1. Passages or ducts 7 extend from the groove 6 to the end portion 1.1 of the body 1. In this example, these ducts 7 are in the form of furrows extending axially over the outside surface of the body 1, over the inner side 6.3, and then radially over the end wall 6.1 of the groove 6 up to the outer side 6.2. The furrow thus opens out onto the end wall 6.1, onto the inner side 6.3, and onto the outer side 6.2.

A seal 8 is received in the groove 6. In this example, the seal 8 is an O-ring seal and has a minor diameter substantially equal to the width of the groove 6 and greater than the depth of the groove 6. It should be noted that the end wall 6.1 of the groove 6 is connected to the inner side 6.3 via a frustoconical surface 15 tending to cause the seal 8 to project from the groove 6 due to the elasticity of the seal 8; or tending to push the seal back against the outer side 6.2 when the seal 8 is moved towards the end wall 6.1 of the groove 6.

The coupling is mounted on the member 100 by engaging the end 1.1 of the body 1 into the channel 101 until the shoulder 5 comes into abutment against the portion of outside surface 103 surrounding the inlet orifice 102. Since the minor diameter of the seal 8 (or the axial width of the seal when it is not an O-ring seal) is greater than the depth of the groove 6, the seal 8 is compressed between the end wall 6.1 of the groove 6 and the portion of outside surface 103 that surrounds the inlet orifice 102. If the body 1 of the coupling comes away, e.g. under the effect of accidental loosening, or of pressurization of the fluid circuit, the compression of the seal 8 decreases. However, the pressurized fluid has filled the groove 6 by going via the ducts 7, and pushes the seal 8 against the portion of outside surface 103 that surrounds the inlet orifice 102 and against the outer side 6.2 of the groove 6, thereby sealing the mounting in leaktight manner by opposing leakage of the fluid towards the outside of the groove 6.

Figure 3:
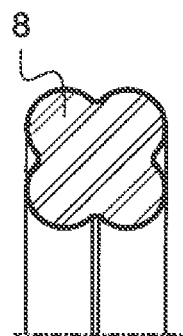
FIG. 3 is a half-view in axial section of a variant embodiments of the seal of the invention.
Figure 4:
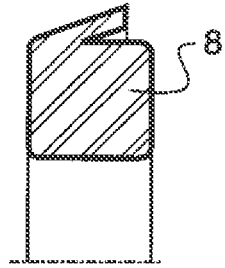
FIG. 4 is a half-view in axial section of another variant embodiment of the seal of the invention.

By way of a variant, as shown in FIGS. 3 and 4, the seal 8 may have a four-lobe section or a rectangular section. In which case, around its outside periphery, the seal 8 may have an annular lip designed to be applied against the outer side 6.2 of the groove 6.

In the second embodiment shown in FIG. 5, the ducts 7 are formed by furrows only extending axially over the outside surface of the end portion 1.1 and over the inner side 6.3 of the groove 6. Facing the end wall 6.1 of the groove 6, the seal 8 has a surface 9 from which projections 10 extend axially, which projections bear against the end wall 6.1 so as to keep the surface 9 spaced apart from the end wall 6.1. The projections 10 enable the fluid to come into contact with the surface 9 in order to push the seal 8 against the portion of outside surface 103 that surrounds the inlet orifice 102.

The seal 8 also has an annular lip 11 extending in axially projecting manner relative to the surface 14 opposite from the end wall 6.1 of the groove 6 and in the vicinity of the inner side 6.3 so as to penetrate into the inlet orifice 102, while being applied against the edge of the inlet orifice in such a manner as to provide relatively leaktight sealing thereat. Thus, the fluid under pressure cannot pass between the portion of outside surface 103 surrounding the inlet orifice 102 and the surface 14 of the seal 8 opposite from the end wall 6.1, and is thus directed between the surface 9 and the end wall 6.1. The effect of the fluid on the movement of the seal 8 towards the portion of outside surface 103 is then further reinforced.

The seal 8 has a radially projecting annular outside bead 12 that is applied against the outer side 6.2, and a collar 13 projecting radially from the surface 14 opposite from the surface 9.

It should be noted that the diameter of the outside bead 12 is greater than the diameter of the collar 13. The beads 12 and 13 are optional.

In a variant, as shown in FIG. 6, the annular lip 11 may be omitted from the seal 8.

Naturally, the invention is not limited to the embodiments described, but rather it encompasses all variants lying within the scope of the invention as defined by the claims.

In particular, the element may be fastened by any means in the channel 101, which fastening means may be releasable or non-releasable. In addition, the connection means for connecting the pipe to the coupling may be instantaneous connection means that are releasable or non-releasable, or non-instantaneous connection means. In addition, the element may be an end-piece fastened permanently to the end of a pipe.

A single passage may be used for bringing the pressurized fluid into the groove, and the passage may, for example, be formed by a through hole extending radially from the groove to the bore defined by the body 1. It can be understood that the passage makes it possible to bring the pressurized fluid onto the inside circumference of the seal and onto the portion of surface of the seal that extends facing the end wall of the groove.

In the second embodiment, the seal has at least two projections preferably distributed symmetrically. The projections and the section of the seal are preferably arranged in a manner such that the surface 9 is larger than the surface 14, so that the difference in the pressures exerted by the fluid on the respective surfaces always tends to bring the seal closer to the portion of outside surface 103.

In a variant, the element may have a structure that is much simpler, as shown in FIG. 7, in which the body of the element is applied against the surface 103 of the member 100. It can be observed that the passage 7 results from the clearance J defined between the body in the vicinity of the inner side 6.3 and the surface 103 of the member, and is also provided with the furrow 7' extending in the end wall 6.1 of the groove 6.3 so as to prevent the seal 8 from being in leaktight contact with the end wall 6.1. In the absence of means for holding the seal 8 against the surface 103 (frustoconical surface 15 and projections 10), the clearance J' must define a passage section (that of groove 7') that is greater than the passage section defined by the clearance j' between the surface 103 and the facing seal 8. This enables the fluid to apply the seal 8 against the surface 103 and against the outer side 6.2.

At least one rib may extend such that it projects from the end wall 6.1 so as to keep the surface 9 of the seal 8 spaced apart from the end wall 6.1, while thereby forming a passage for the fluid, enabling the fluid to reach the outer side 6.2.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connecting a first component in fluid communication with a second component, the first component having a channel, an orifice opening into the channel, and an outside surface surrounding the orifice, the coupling comprising:
    a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway formed as a duct opening onto the inner side of the groove and being connected in fluid communication with the channel of the first component when the body first end portion is coupled to the first component; and
    an annular seal received within the groove, the seal being engagable against the outside surface of the first component when the body first end portion is coupled to the first component,
    whereby when the body first end portion is coupled to the first component such that the body passageway is connected in fluid communication with the channel and the seal is engaged against the outside surface of the first component, the seal is urgable against the outside surface of the first component and the outer side of the groove by fluid introduced from the passageway between the seal and the groove.

2. An assembly comprising a first component and a coupling for connecting the first component in fluid communication with a second component, the first component having a channel, an orifice opening into the channel, and an outside surface surrounding the orifice, and the coupling comprising:
    a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway formed as a duct opening onto the inner side of the groove and being connected in fluid communication with the channel of the first component when the body first end portion is coupled to the first component; and
    an annular seal received within the groove, the seal being engagable against the outside surface of the first component when the body first end portion is coupled to the first component,
    whereby with the body first end portion being coupled to the first component such that the body passageway is connected in fluid communication with the channel and the seal is engaged against the outside surface of the first component, the seal is urged against the outside surface of the first component and the outer side of the groove by fluid introduced from the passageway between the seal and the groove.

3. The assembly of claim 2 wherein:
    the body first end portion is insertable through the orifice into the channel of the first component; and
    the body first end portion is coupled to the first component by being inserted through the orifice into the channel of the first component.

4. A coupling for connecting a first component in fluid communication with a second component, the first component having a channel, an orifice opening into the channel, and an outside surface surrounding the orifice, the coupling comprising:
    a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway being connected in fluid communication with the channel of the first component when the body first end portion is coupled to the first component; and
    an annular seal received within the groove having a seal surface facing the end wall of the groove, the seal surface having at least a pair of projections extending therefrom towards the groove end wall and the seal being spaced-apart from the end wall by the projections, the seal being engagable against the outside surface of the first component when the body first end portion is coupled to the first component,
    whereby when the body first end portion is coupled to the first component such that the body passageway is connected in fluid communication with the channel and the seal is engaged against the outside surface of the first component, the seal is urgable by fluid received within the passageway against the outside surface of the first component and the outer side of the groove.

5. The coupling of claim 4 wherein the passageway is formed as a duct.

6. The coupling of claim 5 wherein the duct opens onto the end wall of the groove.

7. The coupling of claim 5 wherein the duct extends along at least a portion of the body first end portion.

8. The coupling of claim 4 wherein the projections are disposed symmetrically about the seal.

9. A coupling for connecting a first component in fluid communication with a second component, the first component having a channel, an orifice opening into the channel, and an outside surface surrounding the orifice, the coupling comprising:

a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway being connected in fluid communication with the channel of the first component when the body first end portion is coupled to the first component; and an annular seal received within the groove, the seal having a first surface facing the end wall of the groove and a second surface opposite the first surface, the seal second surface having an annular lip extending therefrom adjacent the groove inner side, and the seal lip being received in the channel of the first component when the body first end portion is coupled to the first component, the seal being engagable against the outside surface of the first component when the body first end portion is coupled to the first component, whereby when the body first end portion is coupled to the first component such that the body passageway is connected in fluid communication with the channel and the seal is engaged against the outside surface of the first component, the seal is urgable by fluid received within the passageway against the outside surface of the first component and the outer side of the groove.

10. A coupling for connecting a first component in fluid communication with a second component, the first component having a channel, an orifice opening into the channel, and an outside surface surrounding the orifice, the coupling comprising:

a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the groove end wall being connected to the groove inner side by a frustoconical surface, and the body defining at least one fluid passageway extending from the groove, the passageway being connected in fluid communication with the channel of the first component when the body first end portion is coupled to the first component; and an annular seal received within the groove, the seal being engagable against the outside surface of the first component when the body first end portion is coupled to the first component, whereby when the body first end portion is coupled to the first component such that the body passageway is connected in fluid communication with the channel and the seal is engaged against the outside surface of the first component, the seal is urgable by fluid received within the passageway against the outside surface of the first component and the outer side of the groove.

11. An assembly comprising a first component and a coupling for connecting the first component in fluid communication with a second component, the first component having a channel, an orifice opening into the channel, and an outside surface surrounding the orifice, and the coupling comprising:

a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway being connected in fluid communication with the channel of the first component when the body first end portion is coupled to the first component; and an annular seal received within the groove having a seal surface facing the end wall of the groove, the seal surface having at least a pair of projections extending therefrom towards the groove end wall and the seal being spaced-apart from the end wall by the projections, the seal being engagable against the outside surface of the first component when the body first end portion is coupled to the first component, whereby with the body first end portion being coupled to the first component such that the body passageway is connected in fluid communication with the channel and the seal is engaged against the outside surface of the first component, the seal is urged by fluid received within the passageway against the outside surface of the first component and the outer side of the groove.

12. The assembly of claim 11 wherein the passageway is formed as a duct.

13. The assembly of claim 12 wherein the duct opens onto the end wall of the groove.

14. The assembly of claim 12 wherein the duct extends along at least a portion of the body first end portion.

15. The assembly of claim 11 wherein the projections are disposed symmetrically about the seal.

16. An assembly comprising a first component and a coupling for connecting the first component in fluid communication with a second component, the first component having a channel, an orifice opening into the channel, and an outside surface surrounding the orifice, and the coupling comprising:

a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the body defining at least one fluid passageway extending from the groove, the passageway being connected in fluid communication with the channel of the first component when the body first end portion is coupled to the first component; and an annular seal received within the groove, the seal having a first surface facing the end wall of the groove and a second surface opposite the first surface, the seal second surface having an annular lip extending therefrom adjacent the groove inner side, and the seal lip being received in the channel of the first component when the body first end portion is coupled to the first component, the seal being engagable against the outside surface of the first component when the body first end portion is coupled to the first component, whereby with the body first end portion being coupled to the first component such that the body passageway is connected in fluid communication with the channel and the seal is engaged against the outside surface of the first component, the seal is urged by fluid received within the passageway against the outside surface of the first component and the outer side of the groove.

17. An assembly comprising a first component and a coupling for connecting the first component in fluid communication with a second component, the first component having a channel, an orifice opening into the channel, and an outside surface surrounding the orifice, and the coupling comprising:

a generally tubular body extending axially between a first end portion couplable to the first component and a second end portion couplable to the second component, the first end portion having an outer shoulder and a groove formed in the shoulder, the groove facing the first end portion of the body and having an end wall and an inner and an outer side flanking the end wall, the groove end wall being connected to the groove inner side by a frustoconical surface, and the body defining at least one fluid passageway extending from the groove, the passageway being connected in fluid communication with the channel of the first component when the body first end portion is coupled to the first component; and an annular seal received within the groove, the seal being engagable against the outside surface of the first component when the body first end portion is coupled to the first component, whereby with the body first end portion being coupled to the first component such that the body passageway is connected in fluid communication with the channel and the seal is engaged against the outside surface of the first component, the seal is urged by fluid received within the passageway against the outside surface of the first component and the outer side of the groove.

* * * * *